Patented Sept. 7, 1943

2,329,113

UNITED STATES PATENT OFFICE 2,329,113

HEAT-CONDUCTIVE LUTING MATERIAL

William C. Ferguson, St. Louis, Paul Sussenbach, Richmond Heights, and Cyril H. Smith, Clayton, Mo., assignors to Presstite Engineering Company, St. Louis, Mo., a corporation of Missouri No Drawing. Application May 14, 1941, Serial No. 393,428

7 Claims. (Cl. 260—734)

This invention relates to heat-conducting luting material, and more particularly to an improvement upon the invention disclosed in the United States patent application of William C. Ferguson, et al., for Heat-conducting luting material, Serial No. 282,065, filed July 30, 1939, now Patent 2,311,526.

Among the several objects of the invention may be noted the provision of a mastic-like luting material which has incorporated therein a relatively large percentage of earthy or clay-like particles for heat-conductive purposes, whereby the material is adapted for use, for example, as a plastic or mastic connecting material used for surrounding objects in respect to which it is desired to conduct heat either to or away from said article, such as cooling or heating coils; the provision of a material of the class described which is substantially odorless and which is adhesive to metal surfaces; the provision of a material of the class described which does not harden and eventually crack away; the provision of a material of the class described which maintains its usable plastic characteristics over wide ranges of temperature; and the provision of a material of this class which is very economical to manufacture. Other objects will be in part obvious and in part pointed out hereinafter.

The invention accordingly comprises the ingredients and combinations of ingredients, the proportions thereof, and features of composition, which will be exemplified in the products hereinafter described, and the scope of the application of which will be indicated in the following claims.

As made clear in said application, in the construction of ice cream cabinets, beverage coolers, and like apparatus, the container can in these cabinets is most usually cooled by means of refrigerant which circulates in a copper tube which is conducted back and forth across the surface of the container. The effectiveness of this arrangement depends upon the ability of the brine in the tube to absorb the heat from the interior of the cabinet. This effectiveness is very largely dependent upon contact between the copper tube and the outer face of the container.

The current practice is either to continuously solder such tubes to the cabinet, or to spot-weld thin strips of metal to attach the tube to the container. The soldering procedure, although fairly satisfactory from the mechanical and heat-transference standpoints, is disadvantageous both in the cost of the solder and in the labor cost incident to using the solder. With the spot welding procedure, which is cheaper, more disadvantages accrue. As both the tube and the container wall are irregular in shape, only indifferent contact, however, is thereby secured. Consequently this method of attaching tubes to the outer walls of the container is disadvantageous in the poor heat conductive relationship obtained between the tubes and the container.

The present invention provides a material of plastic characteristics, somewhat like a putty, for example, which exhibits strong adhesive qualities for the metals of the tube and the container wall, and which may be used in such massive quantities as to bring about a relatively large area of heat transmission between the tube and the container wall.

A suitable composition for the purpose is as follows:

| Item: | Per cent by weight |
|---|---|
| Bauxite tailings (14 mesh) | 74.90 |
| Mineral oil (light grade, pale) | 24.20 |
| Rubber (crepe) | .24 |
| Stearic acid (preferably pressed two or more times, but not necessarily so) | .26 |
| Carbon black | .40 |
| | 100.00 |

In the above example, the rubber is first cut up and dispersed in the mineral oil at a temperature of 300° F. This may be done in a dough mixer. The resulting substance is mixed with the bauxite, stearic acid and carbon black in percentages indicated. The resulting material is of a mastic nature that it may be applied with a trowel or the like, not unlike plaster.

A second example is as follows:

| Item: | Per cent by weight |
|---|---|
| Bauxite (20 mesh) | 43.40 |
| Standard varnish-makers aluminum flakes | 7.45 |
| Graphite (approximately 300 mesh) | 20.65 |
| Motor oil (S. A. E. 80) | 11.60 |
| Mineral oil (light grade, pale) | 16.44 |
| Rubber derivative (trade-name Pliolite, for example; un-milled) | .46 |
| | 100.00 |

As is known, "Pliolite" is a derivative obtained from rubber and is made by treating rubber with a reagent from the group consisting of chlorostannic acid and halides of amphoteric metals. For further details of its characteristics see "The Rubber Age," vol. 45, No. 1, of April 1939, pages 17–21; the Wilson et al. Patent No. 2,216,362, dated October 1, 1940; and the references cited in both.

In this second example, the aluminum flake, graphite, motor oil and pale oil are heated together at a temperature of the order of 300° F. before the addition of the rubber and bauxite.

The first example above given has a weight per gallon of 14 pounds, and the second example has a weight per gallon of 13.5 pounds.

The following figures are useful in indicating advantages of the invention. For example, on a given test the heat flow from a bare pipe to a connected plate was measured at 64 B. t. u. per lineal foot per hour. By employing plastic with metal (aluminum) flake along the lines indicated in said prior patent application, a heat flow with respect to the same pipe was obtained of 194 B. t. u. per lineal foot per hour. When using the substance of the first example above given, that is, a substance wherein only bauxite is used as a heat-conducting solid, the heat transmission on the same pipe was 160 B. t. u. per lineal foot per hour. In the second example, in which bauxite and aluminum flakes were used, a heat flow of 212 B. t. u. per lineal foot per hour was obtained.

The above comparative figures show that the bauxite particles account for a large proportion of the heat-conductive effect.

Advantages of the invention are that a highly heat-conductive material is obtained, the largest constituent of which is the cheapest kind of a substance, namely, bauxite or bauxite tailings.

In view of the above, it will be seen that the several objects of the invention are achieved and other advantageous results attained.

As many changes could be made in the above products without departing from the scope of the invention, it is intended that all matter contained in the above description shall be interpreted as illustrative and not in a limiting sense.

We claim:

1. A permanently mastic luting material comprising a mineral oil base, and one substance selected from the group consisting of bauxite and bauxite tailings, said substance being distributed throughout said base.

2. A luting material comprising a mineral oil base throughout which a rubber compound is dispersed, and a major proportion of at least one substance selected from the group consisting of bauxite and bauxite tailings, said substance being likewise distributed throughout said oil, said luting material being substantially permanently mastic, said rubber derivative comprising rubber treated with a reagent from the group consisting of chlorostannic acid and halides of amphoteric metals.

3. A luting material comprising a mineral oil base, a minor proportion of a rubber compound dispersed throughout said base, and a major proportion of at least one substance selected from the group consisting of bauxite and bauxite tailings also distributed throughout said base, said luting material being substantially permanently mastic, said rubber derivative comprising rubber treated with a reagent from the group consisting of chlorostannic acid and halides of amphoteric metals.

4. A luting material comprising a mineral oil base throughout which a rubber compound is dispersed, and a major proportion of bauxite tailings and a minor proportion of stearic acid and carbon black dispersed throughout said oil, said luting material being substantially permanently mastic, said rubber derivative comprising rubber treated with a reagent from the group consisting of chlorostannic acid and halides of amphoteric metals.

5. A luting material comprising a mineral oil base throughout which a rubber compound is dispersed, and a major proportion of bauxite and graphite and a minor proportion of aluminum flakes distributed throughout said oil, said luting material being substantially permanently mastic, said rubber derivative comprising rubber treated with a reagent from the group consisting of chlorostannic acid and halides of amphoteric metals.

6. A permanently mastic luting material comprising an inert stable non-volatile mineral oil base, graphite, one substance selected from the group consisting of bauxite and bauxite tailings, said substance and graphite being distributed throughout said base.

7. A luting material comprising a mineral oil base throughout which rubber is dispersed, and a major proportion of bauxite tailings and a minor proportion of stearic acid and carbon black dispersed throughout said oil, said luting material being substantially permanently mastic.

WILLIAM C. FERGUSON.
PAUL SUSSENBACH.
CYRIL H. SMITH.